(12) United States Patent
Williams

(10) Patent No.: US 6,978,465 B2
(45) Date of Patent: Dec. 20, 2005

(54) CONTROL OF DEVICE-DRIVER PERSISTENCY

(75) Inventor: Mitch A. Williams, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 484 days.

(21) Appl. No.: 09/737,158

(22) Filed: Dec. 14, 2000

(65) Prior Publication Data

US 2002/0078258 A1 Jun. 20, 2002

(51) Int. Cl.[7] .............................................. G06F 13/10
(52) U.S. Cl. .................................................. 719/321
(58) Field of Search ........................ 709/321; 719/321

(56) References Cited

U.S. PATENT DOCUMENTS 5,581,766 A * 12/1996 Spurlock ....................... 713/2
5,710,941 A * 1/1998 Parry ........................... 710/14
5,910,180 A * 6/1999 Flory et al. .................. 709/321
6,282,586 B1 * 8/2001 Bullough ...................... 710/18

OTHER PUBLICATIONS

Kim, Y J, Method for performing inter-shared memory, Jul. 19, 1999.*
Kim , Method for perfoming inter-processor communication using coupled message queue with shared memory, Jul. 19, 1999.*

* cited by examiner

Primary Examiner—Meng-Al T. An
Assistant Examiner—LeChi Truong
(74) Attorney, Agent, or Firm—Fish & Richardson P.C.

(57) ABSTRACT

In a server having several network-interface cards each under control of a corresponding device driver, a method for controlling persistency of a device driver in memory includes determining whether an intermediate driver present in memory. If so then the device driver is set to be persistent in memory. This preserves the integrity of the interface between the intermediate driver and the device driver during replacement of a failed network-interface card.

25 Claims, 4 Drawing Sheets

CONTROL OF DEVICE-DRIVER PERSISTENCY

The invention relates to controlling device-driver persistency.

BACKGROUND

In a local area network, a server communicates with its clients through its network-interface cards. Network-interface cards are available from a variety of manufacturers and differ in the details of their implementation. This situation is analogous to the variety of fax machines available, many of which have different layouts of buttons and different set-up procedures. From the telephone line's point of view, these fax machines are virtually identical. However, from the user's point of view, these machines are different enough so that an instruction manual must often be consulted.

Because of these differences between network-interface cards, it is desirable to provide each network-interface card with a device driver that accepts a standard list of commands and attends to the details of executing those commands on the network-interface card. The operating system can then communicate with the driver, using a standardized interface, instead of directly with the card. In the context of fax machines, this would be analogous to dispensing with the instruction manual altogether and instead shipping each fax machine with a personal servant who is an expert in all the features of that fax machine.

Occasionally, a network-interface card will malfunction and require replacement. Because the server is essential to continued operation of the network, it is important that replacement occur without taking the server off-line. To accomplish this, a system operator unloads from memory the device driver corresponding to malfunctioning network-interface-card. Following installation of a replacement network-interface-card, the system operator causes a replacement device-driver corresponding to that network-interface card to be loaded into memory. This replacement device-driver then establishes communication with the replacement network-interface-card.

A device driver that is configured to be unloaded from memory during the replacement of a malfunctioning network-interface-card is said to be operating in "non-persistent" mode. Non-persistency is advantageous because it eliminates the task of associating the replacement network-interface-card with an existing device driver. It also eliminates the constraint that the replacement network-interface-card be one that is compatible with a device driver that is already in memory.

In some servers, several network-interface cards are available for communication with clients. This is useful for two reasons: if one network-interface card fails, the server can still communicate with the client through another network-interface card; and if one network-interface card is busy communicating with a first client, the server can communicate with a second client through a second network-interface card.

In a server having more than one network-interface card, an intermediate driver is often placed between the operating system and the device drivers for the individual network-interface cards. This intermediate driver manages the process of selecting an available network-interface card and communicating with the device driver for that card. In addition, the intermediate driver associates with each device driver a particular protocol to be used in connection with the operation of the network-interface card. This association is made only when the server is first booted.

Because the association between a protocol and a device driver is made only when the server is first booted, a device driver that is not present at that time will not have an associated protocol bound to it. It is therefore unwise to add or delete device drivers once the intermediate driver has bound the device drivers to corresponding protocols. As a result, when a network-interface card fails in such a system, it is preferable to keep the device driver in memory throughout the replacement process. This ensures that protocols bound to the device driver are not lost.

To replace a network-interface card in a server having an intermediate driver, the device driver is first instructed to refrain from communicating with the network-interface card until further notice. The board is then removed and replaced. The device driver then detects the existence of a new board and establishes communications with it. Once it does so, the device driver makes itself available to the intermediate driver. A device driver operating in this manner is said to be operating in persistent mode.

The persistency status of a driver is selected as part of the driver installation procedure. For those device drivers that support persistency, a keyword can be manually added to a configuration file as part of the installation. This can lead to additional calls to technical support for assistance in configuring the driver, and hence to increased customer support costs.

DETAILED DESCRIPTION

Figure 1:
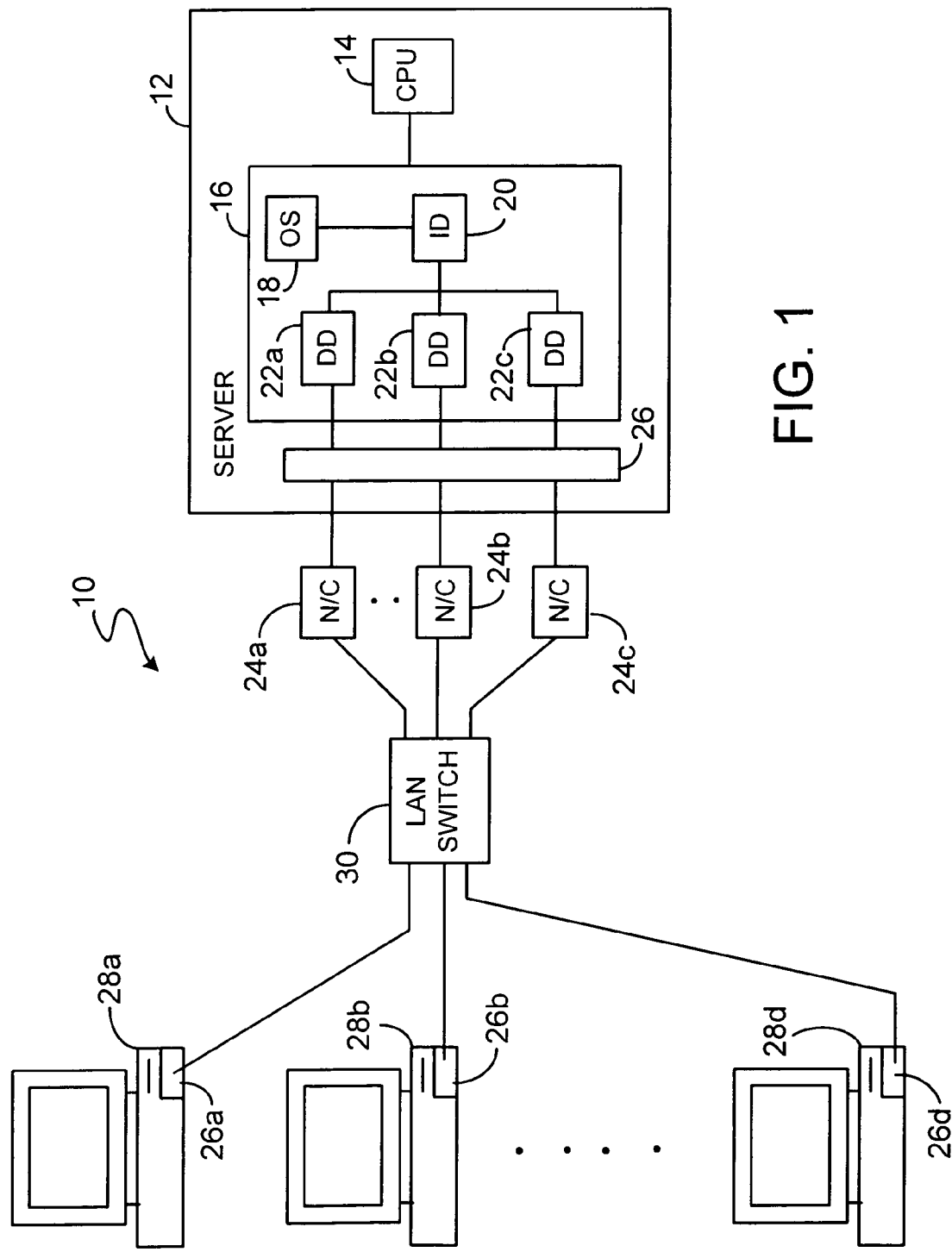
FIG. 1 is a schematic illustration of a local-area network.

Referring to FIG. 1, a system 10 incorporating the invention includes a server 12 having a processor 14 in communication with a memory 16. Within the memory 16, an operating system 18 is in communication with an intermediate driver 20. The intermediate driver 20 is in communication with a plurality of device drivers 22a–c. Each device driver 22a–c is in communication with a corresponding network-interface card 24a–c over a PCI bus 26. The network-interface cards 24a–c of the server, together with network-interface cards 26a–d associated with respective clients 28a–d, are all connected to a LAN switch 30.

Each device driver 22a–c includes an interface for accepting messages from other processes in memory 16. In the case of a server 12 having only a single network-interface card 24a, the process that sends messages to the device driver 22a is the operating system 18. In the case of a server 12 having several network-interface cards 24a–c, the process that sends messages to the device drivers 22a–c corresponding to those network-interface cards is the intermediate driver 20.

To send a message to a selected device-driver 22a, a calling process typically calls a function known to the device driver 22a and passes that function a parameter indicative of what the calling process wants the driver to do. Since the selected device-driver 22a may ultimately have to respond to that calling process, the parameter generally includes information indicative of the identity of the calling process.

An example of such a function is the function "Driver-Management( )" that is common to most device drivers. The parameter passed to the device driver is referred to as an "event control block" or "ECB." An ECB includes a header, which contains information identifying the calling process, and a body containing instructions to be executed by the device driver.

A device driver 22a can learn enough about its operating environment to automatically select a persistency status that is appropriate for that environment. By doing so, the device driver 22a relieves system maintenance personnel from having to manually configure persistency status and reduces the possibility of error in doing so.

Figure 2:
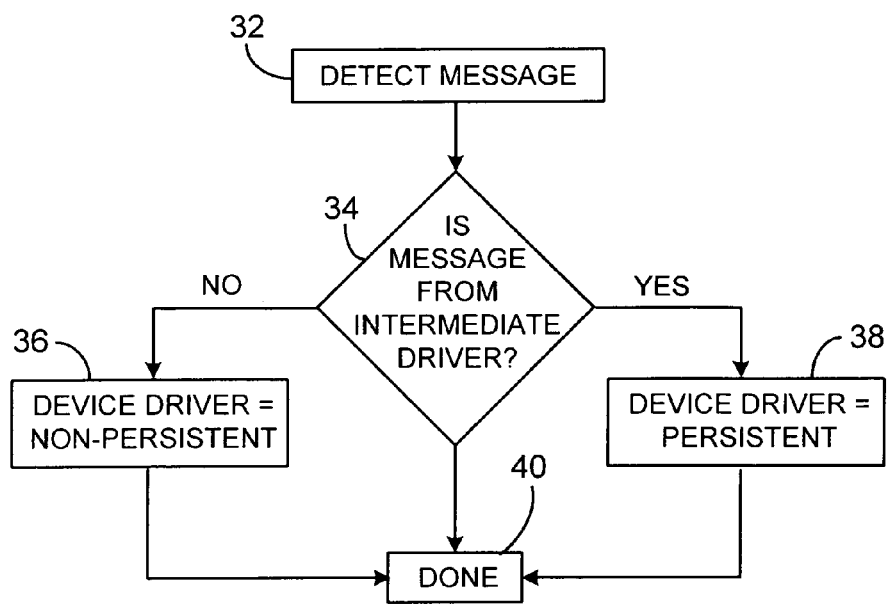
FIGS. 2–4 are flow-charts for methods of altering the persistency status of a device driver.

As shown in FIG. 2, the device driver may detect 32 a message from a calling process and determine 34 whether the calling process sending that message is an intermediate driver. This information can be extracted from a parameter, such as an ECB, that the calling process passes to the device driver.

If the device driver determines that the message originated in an intermediate driver, it then sets 36 itself to operate in persistent mode. If it determines that the message did not originate in an intermediate driver, it sets 38 itself to operate in a non-persistent mode.

The device driver can default to operating in non-persistent mode, in which case setting 38 itself to operate in non-persistent mode amounts to refraining from executing any instructions. When the device driver is configured to operate in non-persistent mode by default, setting 36 itself to operate in persistent mode includes sending a message to the operating system to register itself as a persistent-mode device-driver.

Conversely, the device driver can default to operating in persistent mode, in which case setting 36 itself to operate in persistent mode amounts to refraining from executing any instructions. When the device driver is configured to operate in persistent mode by default, setting 38 itself to operate in non-persistent mode can include sending a message to the operating system to register itself as a non-persistent-mode device-driver.

Finally, the device driver can be configured to have no default state. If this is the case, then the device driver sends a message to the operating system to register itself as operating in persistent mode or non-persistent mode as the case might be.

Once the device driver has determined 40 the correct persistency status for its operating environment, it carries out whatever instructions there are in the body of the message. The processing of the body of the message need not occur after the device driver has determined its correct persistency status. The device driver can instead process the body of the message first and then, after having done so, inspect the message to identify the calling process.

Figure 3:
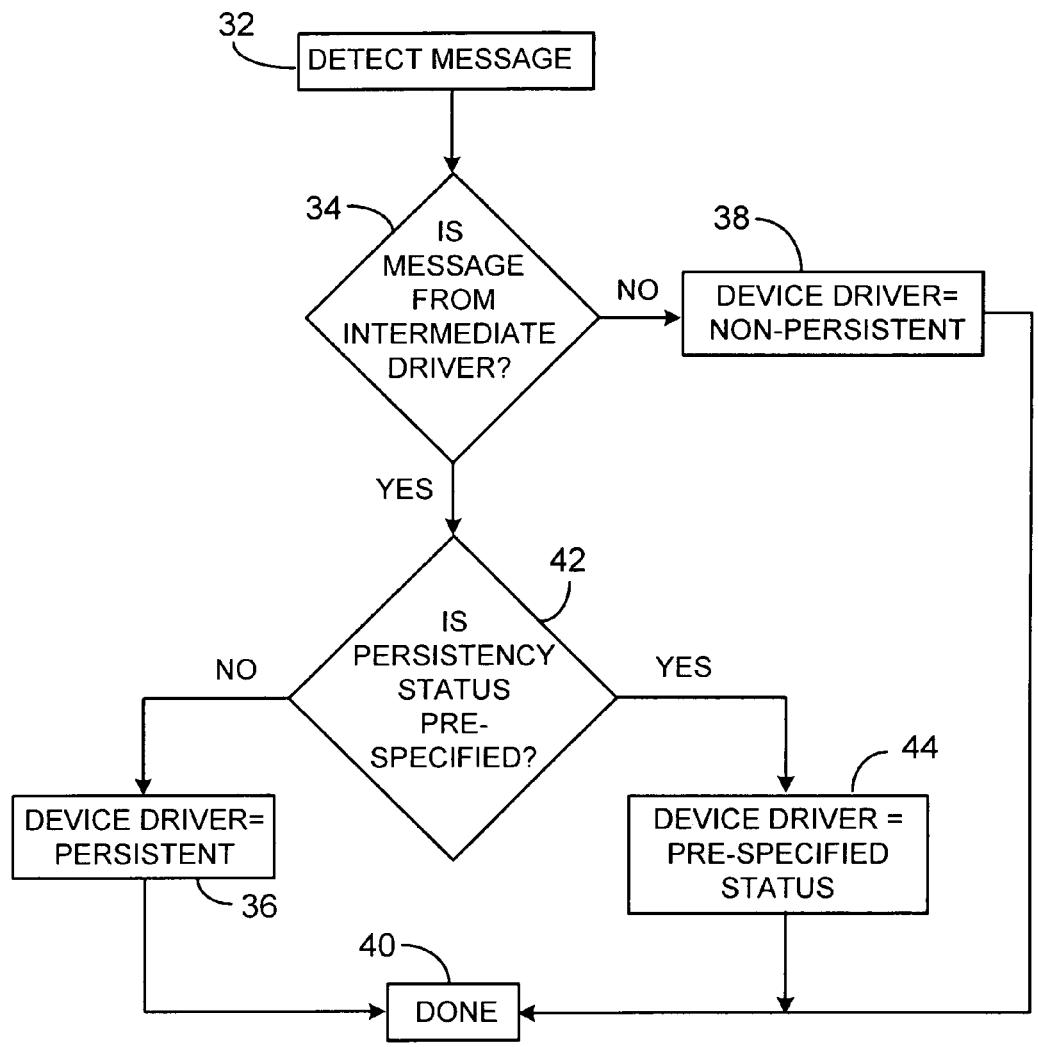

In some implementations, automatic determination of persistency status can be manually overridden by pre-specifying a preferred persistency status. The preferred persistency status can be set using a software switch, such as a keyword in a configuration file, or a hardware switch such as a physical switch on the network-interface card. In either case, the device driver proceeds as shown in FIG. 3.

The device driver detects 32 a message from the calling process and identifies 34 the calling process responsible for that message, as described in connection with FIG. 2. If the device driver determines that the message did not come from an intermediate driver, the device driver sets itself to operate 38 in non-persistent mode and then proceeds with executing 40 any instructions in the body of the message as described in connection with FIG. 2.

If, on the other hand, the device driver determines that the message did come from an intermediate driver, then the device driver checks 42 whether a preferred persistency status has been pre-specified. This can be achieved, as noted above, by examining a configuration file.

If no preferred persistency status has been specified, the device driver causes itself to operate in persistent mode 36. If a preferred persistency status has been specified, the device driver causes itself to operate in the pre-specified status 44.

Figure 4:
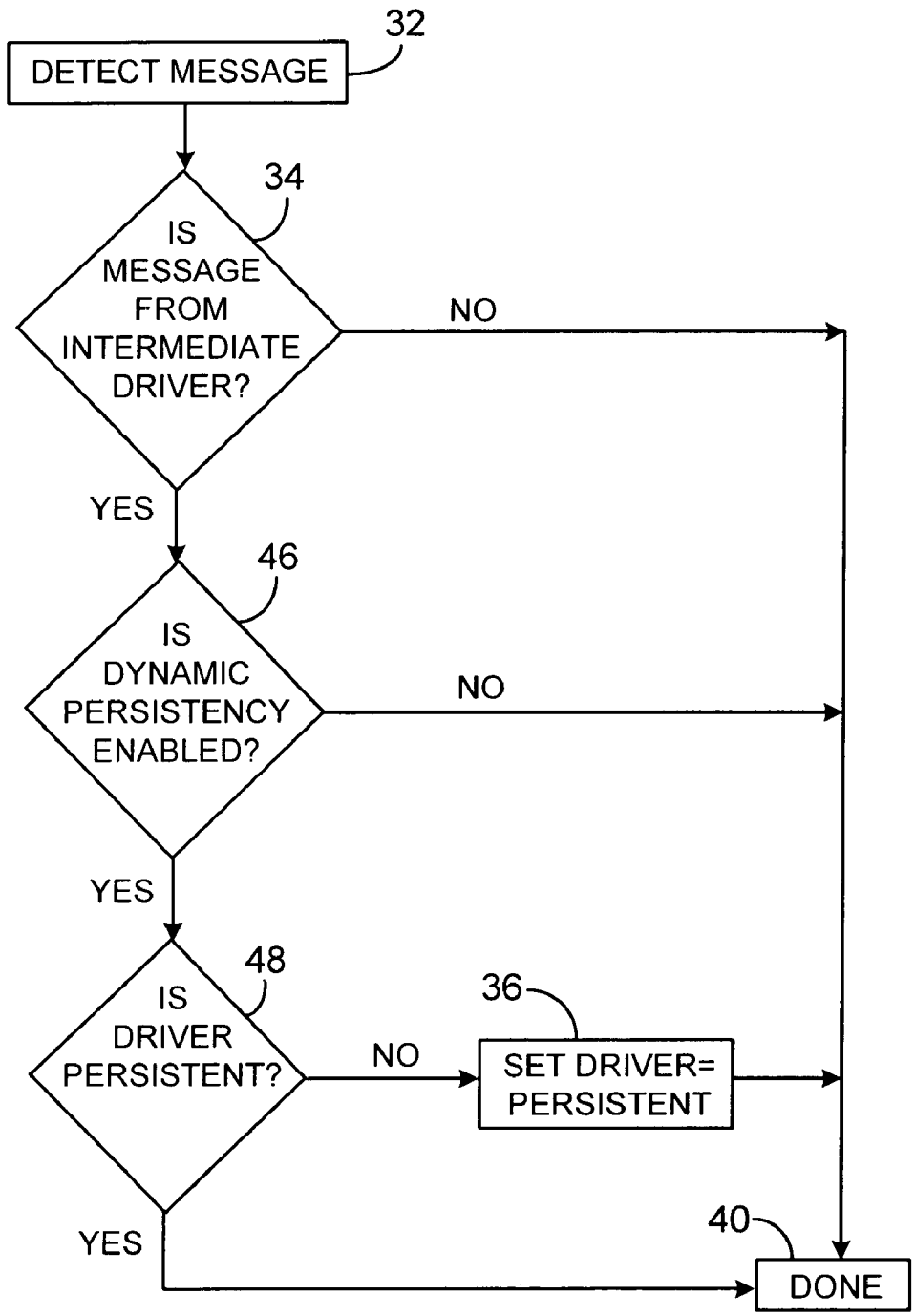

In another example, shown in FIG. 4, the device driver checks to see if its ability to automatically select an appropriate persistency state has been disabled. Referring now to FIG. 4, the device driver detects 32 a message from the calling process and identifies 34 the calling process responsible for that message, as described in connection with FIG. 2. If the device driver determines that the message originated from a process other than an intermediate driver, it proceeds with executing 40 any instructions in the body of the message as described in connection with FIG. 2. If the device driver determines 34 that the message originated from an intermediate driver, then it checks 46 to see if the automatic setting of persistency status has been disabled.

Automatic setting of persistency status can be enabled and disabled by a software switch, such as a keyword in a configuration file. In this case, the device driver determines whether automatic setting of persistency status is enabled or disabled by opening a configuration file and checking its contents. Alternatively, automatic setting of persistency status can be enabled and disabled by a hardware switch on the network-interface card itself.

If the device driver determines 46 that it is not to automatically determine an appropriate persistency status, it proceeds with executing 40 any instructions in the body of the message as described in connection with FIG. 2. Otherwise it proceeds to check 48 whether it is already operating in persistent mode. If the device driver determines that it is already operating in persistent mode, then no persistency status change is required and the device driver proceeds with executing any instructions in the body of the message. Otherwise, the device driver sets itself to operate in persistent mode before proceeding with executing the instructions in the body of the message.

The example illustrates how a device-driver may adaptively switch between operating in persistent mode and operating in non-persistent mode as circumstances require. It does so by detecting the existence of an intermediate driver in memory.

When an intermediate driver is not present in memory, the device driver operates as a non-persistent driver, which is the preferred mode in the absence of an intermediate driver. When an intermediate driver is present in memory, the device driver operates in persistent mode, thereby enabling its corresponding network-interface card to be replaced without disturbing the interface between itself and the intermediate driver.

Other embodiments are within the scope of the following claims:

What is claimed is:

1. A computer implemented method comprising:
    determining whether an intermediate driver is present in memory, wherein determining whether an intermediate driver is present in memory comprises:

receiving a message from a calling process, wherein receiving a message from a calling process comprises receiving an event control block from said calling process; and determining, on the basis of said message, whether said calling process is an intermediate driver; and adaptively controlling a persistency of a device driver present in memory on the basis of whether said intermediate driver is present in memory.

2. The method of claim 1 further comprising setting said device driver to be non-persistent when an intermediate driver is not present in memory.

3. The method of claim 1 further comprising setting said device driver to be persistent when an intermediate driver is present in memory.

4. The method of claim 1 further comprising:
determining whether persistency for said device driver is pre-specified; and
if said persistency is pre-specified, setting said device driver to operate consistently with said pre-specified persistency.

5. The method of claim 1 further comprising:
specifying a default persistency for said device driver; and
setting said device driver to said default persistency on the basis of whether an intermediate driver is present in memory.

6. The method of claim 1 further comprising:
specifying a default persistency for said device driver;
if an intermediate driver is present in memory, determining whether persistency of said driver is under automatic control; and
if persistency of said device driver is under automatic control setting said driver to be persistent.

7. A server comprising:
a network-interface card configured to receive a message from a calling process;
a memory;
a device driver for interfacing with said network-interface card, said device driver being configured to, at least in part on the basis of said message:
adaptively set its persistency in said memory on the basis of whether an intermediate driver is present in said memory,
determine whether persistency for said device driver is pre-specified, and
if said persistency is pre-specified, set said device driver to operate consistently with said pre-specified persistency.

8. The server of claim 7 wherein said device driver is configured to be persistent in said memory when an intermediate driver is present in said memory.

9. The server of claim 7 wherein said device driver is configured to be non-persistent in said memory when an intermediate driver is not present in said memory.

10. The server of claim 7 wherein said device driver is configured to receive a message from a calling process in said memory and to determine, on the basis of said message, whether said calling process is an intermediate driver.

11. The server of claim 7 further comprising configuration data for said device driver.

12. The server of claim 11 wherein said configuration data comprises data indicative of a pre-specified persistency state for said device driver.

13. The server of claim 11 wherein said configuration data comprises instructions to disable automatic persistency determination by said device driver.

14. A network interface for enabling a computer to send and receive messages over a network, said network interface comprising:
a network-interface card in communication with a memory element of said computer;
a device driver for controlling said network-interface card in response to messages received from a calling process, said device driver being configured to set its persistency in said memory on the basis of said calling process wherein said device driver is configured to:
determine whether persistency for said device driver is pre-specified; and
if said persistency is pre-specified, set said device driver to operate consistently with said pre-specified persistency.

15. The network interface of claim 14 wherein said device driver is configured to determine, on the basis of a message received from said calling process, whether said calling process is an intermediate driver.

16. The network interface of claim 14 wherein said device driver is configured to set said device driver to be non-persistent when said calling process is not an intermediate driver.

17. The network interface of claim 14 wherein said device driver is configured to set said device driver to be persistent when said calling process is an intermediate driver.

18. The network interface of claim 14 wherein said device driver is set to a default persistency when said calling process is not an intermediate driver.

19. The network interface of claim 14 wherein said automatic control of persistency status by a device driver can be disabled and disabled and said device driver is configured to be persistent when said automatic control of persistency status is enabled and said calling process is an intermediate driver.

20. A machine-readable medium having encoded thereon software for controlling persistency of a device driver in memory, said software comprising instructions for:
determining, at least in part on the basis of a message received from a calling process, whether an intermediate driver is present in memory; and
adaptively setting said persistency of said device driver on the basis of whether said intermediate driver is present in memory;
determining whether persistency for said device driver is pre-specified; and
if said persistency is pre-specified, setting said device driver to operate consistently with said pre-specified persistency.

21. The machine-readable medium of claim 20 wherein said instructions for determining whether an intermediate driver is present in memory comprise instructions for:
receiving a message from a calling process; and
determining, on the basis of said message, whether said calling process is an intermediate driver.

22. The machine-readable medium of claim 20 wherein said instructions for receiving a message from a calling process comprise receiving an event control block from said calling process.

23. The machine-readable medium of claim 20 wherein said software further comprises instructions for setting said device driver to be non-persistent when an intermediate driver is not present in memory.

24. The machine-readable medium of claim 20 wherein said software further comprises instructions for setting said device driver to be persistent when an intermediate driver is present in memory.

25. The machine-readable medium of claim 20 wherein said software further comprises instructions for:

specifying a default persistency for said device driver;

if an intermediate driver is present in memory, determining whether persistency of said driver is under automatic control; and if persistency of said device driver is under automatic control setting said driver to be persistent.

* * * * *